US005250793A

United States Patent [19]

Nagashima et al.

[11] Patent Number: 5,250,793

[45] Date of Patent: Oct. 5, 1993

[54] CONVEYING APPARATUS FOR TICKET PROCESSING MACHINE

[75] Inventors: Masayoshi Nagashima, Chigasaki; Mamoru Honma, Yokohama, both of Japan

[73] Assignee: Kabushiki Kaisha Toshiba, Kawasaki, Japan

[21] Appl. No.: 813,940

[22] Filed: Dec. 27, 1991

[30] Foreign Application Priority Data

Jan. 31, 1991 [JP] Japan .................................. 3-10860

[51] Int. Cl.[5] ............................................ G06K 13/00

[52] U.S. Cl. .................................. 235/475; 235/449; 235/384; 235/379

[58] Field of Search ................ 235/379, 449, 384, 475

[56] References Cited

U.S. PATENT DOCUMENTS 3,958,103 5/1976 Oka et al. .

FOREIGN PATENT DOCUMENTS 0169745 1/1986 European Pat. Off. .
0269121 6/1988 European Pat. Off. .
0288300 10/1988 European Pat. Off. .
0362220 4/1990 European Pat. Off. .

*Primary Examiner*—Harold Pitts
*Attorney, Agent, or Firm*—Cushman, Darby & Cushman

[57] ABSTRACT

A shutter and an intake roller are mounted to a gate to form an integral structure. The shutter and the intake roller are interlockingly operated by the swinging of the gate. During the processing of a used ticket, the shutter prevents another used ticket from being inserted into the machine through the inlet port. Also, the used ticket is guided from the ticket transporting path to the recovery transporting path by the swing of the gate.

10 Claims, 3 Drawing Sheets

CONVEYING APPARATUS FOR TICKET PROCESSING MACHINE

BACKGROUND OF THE INVENTION

1. Field of the Invention

The present invention relates to a ticket processing machine used for automatic fare adjustment, for example, due to changing trains in a station.

2. Description of the Related Art

The ticket processing machine of this type includes a ticket port formed in a front portion of the machine body, as described in, for example, Japanese Patent Disclosure (kokai) No. 57-29195. If a used ticket is put into the machine through the ticket port, the ticket is detected by a detector. As a result, the shutter positioned behind the ticket port is opened, and an intake roller is moved to the ticket port to take in the used ticket. Then, the ticket is conveyed along a transfer path, and the information recorded in the back surface of the ticket is read out by a magnetic reading apparatus.

Paper fed from a roller is cut into a ticket of a predetermined size, the ticket is moved into a printing apparatus and the information read out from the used ticket is printed on the new ticket. Then, the new ticket is forwarded into a magnetic writing apparatus and the required information is printed on the back surface. Further, the new ticket is issued as a fare-adjusted ticket from the ticket port.

The used ticket, from which the information has been read out, is moved back and guided into a recovery box by a guide mechanism.

In the prior art described above, however, the shutter and the guide mechanism are independently arranged and individually operated, leading to a complex mechanical structure, a low reliability and a high operating cost.

SUMMARY OF THE INVENTION

An object of the present invention is to provide a ticket processing machine comprising a guide means which also performs the function of a shutter to permit simplification of the mechanical structure.

According to the present invention, there is provided a conveying apparatus, comprising:

an inlet port for receiving the recording medium;

reading means for reading the information from the recording medium;

first conveying means for conveying the recording medium from the inlet port to the reading means;

second conveying means for conveying the recording medium read by the reading means from the reading means to other position in the apparatus, the second conveying means is branched from a predetermined position of the first conveying means; and guiding means, provided at the predetermined position of the first conveying means and selectively positionable into a first and second alignment, for guiding the recording medium from the inlet port to the reading means in the first alignment and for guiding the recording medium from the first convey means to the second convey means and preventing insertion of another recording medium to the first conveying means received by the inlet port in the second alignment.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
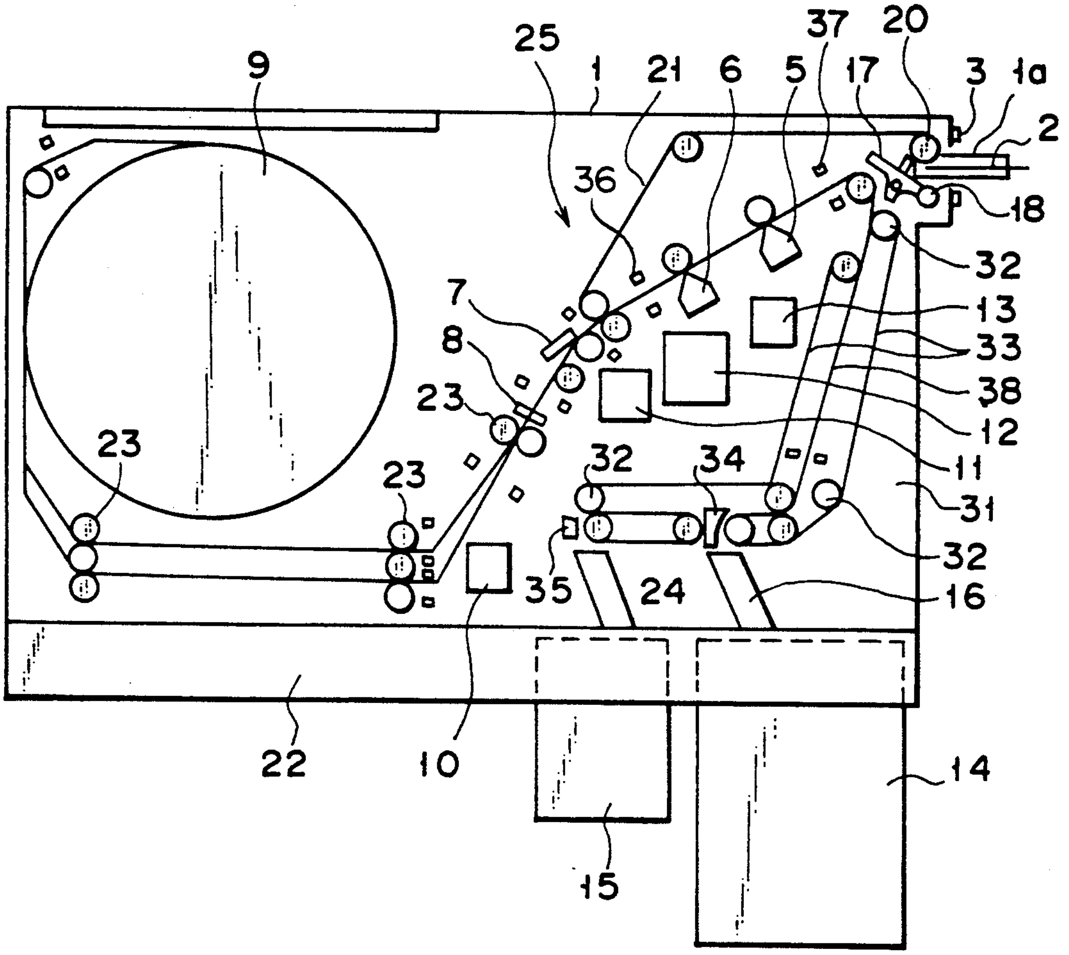
FIG. 1 schematically shows the construction of a ticket processing machine according to one embodiment of the present invention.
Figure 4:
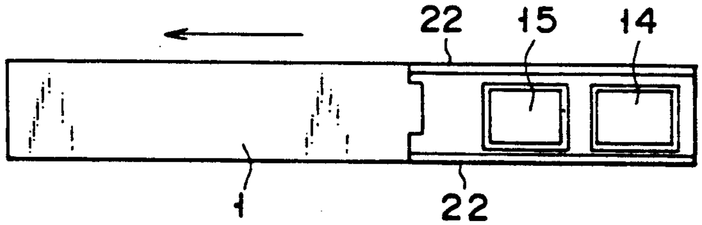
FIG. 4 is a plan view showing the slidden state of the guiding device.

The accompanying drawings collectively show a ticket processing machine provided with a conveying apparatus according to one embodiment of the present invention. As shown in FIG. 1, the machine comprises a machine body 1. The machine body 1, as shown in FIG. 4, is slidably mounted to guide rails 22.

An inlet port 1*a* for inserting a used ticket (first recording medium) 2 is formed in an upper front portion of the machine body 1. A ticket transporting path 21 acting as a first transfer means and communicating with the inlet port 1*a* is formed within the machine body 1. A magnetic read head 5 as a processing device for reading the magnetic information recorded on the back surface of the used ticket 2 is mounted to the ticket transporting path 21. A magnetic write head 6 for writing a magnetic information on the back surface of a fare-adjusted ticket second recording medium based on the information read out by the reading head 5 is also mounted to the ticket transporting path 21. The write head 6 is positioned downstream of the read head 5 in the transporting direction of the used ticket 2. A printing unit 7 for printing information on the fare-adjusted ticket based on the read-out information is disposed downstream of the write head 6. Further, a cutter unit 8 for cutting a rolled paper 9 to prepare a ticket of a predetermined size is disposed upstream of the printing unit 7 in the transporting direction of the rolled paper 9. It should be noted that the magnetic write head 6, the printing unit 7 and the cutter unit 8 collectively form an issuing device 25 acting as a processing device.

A cutter motor 11 for driving the cutter unit 8 is disposed in the vicinity of the ticket transporting path 21. A printing motor 12 for driving the printing unit 7 is disposed near the cutter motor 11. Further, an encode motor 13 is disposed near the printing motor 12.

The rolled paper 9 referred to previously, which is disposed at one end portion within the machine body 1, is forwarded to the printing unit 7 via transfer rollers 23.

A recovery transporting path 31, which is branched from the ticket transporting path 21, for recovering the used ticket 2 is formed in the other end portion within the machine body 1. The recovery transporting path 31, which acts as a second transfer means, consists of a number of rollers 32 and a belt 33 stretched over these rollers 32. An intermediate portion of the recovery transporting path 31 constitutes a storing portion 38 for temporarily storing the ticket.

As shown in FIG. 4, the machine body 1 is slidably mounted on the guide rails 22. An error ticket box 15 and a recovery box 14 are disposed between the guide rails 22 and outside of the machine body 1. These error ticket box 15 and recovery box 14 communicate with gates 34 and 35 through chutes 24 and 16, respectively.

Figure 2:
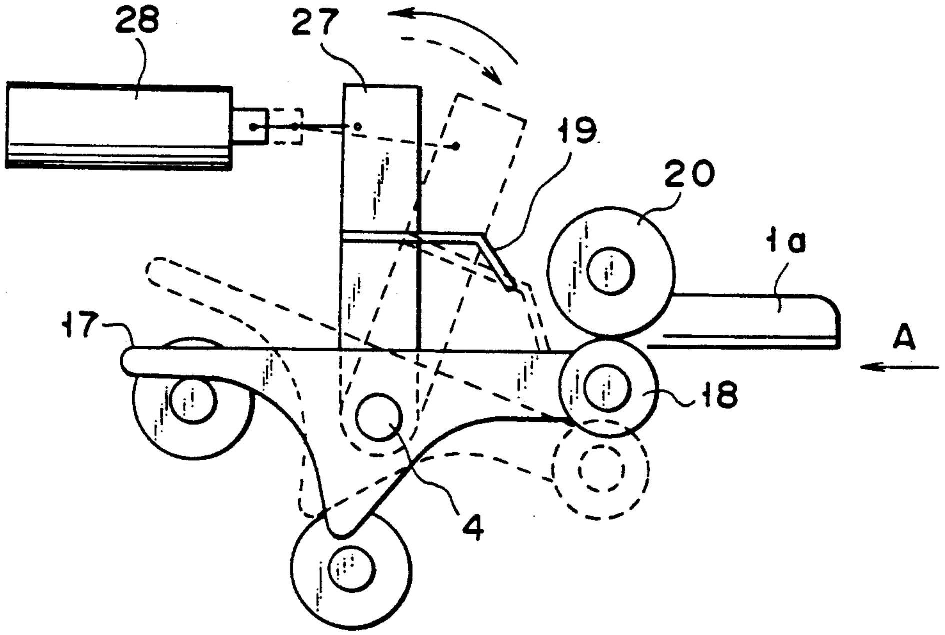
FIG. 2 shows the construction of a guiding device included in the ticket processing machine shown in FIG. 1.
Figure 3:
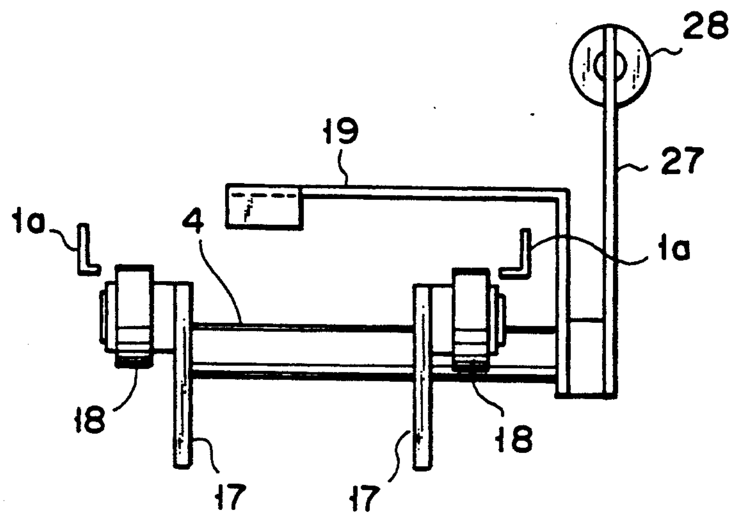
FIG. 3 is a front view of the guiding device shown in FIG. 2.

As shown in FIG. 2, a gate 17 acting as a guide device is disposed in the vicinity of the inlet port 1*a*. The gate 17 is swingably pivoted to a supporting shaft 4. An intake roller 18 is rotatably mounted to one end portion of the gate 17. A shutter 19, which acts as a guide device, for opening or closing the inlet port 1*a* is mounted to one end portion of the supporting shaft 4. Also, a solenoid 28 is connected via a driving lever 27 to said one end portion of the supporting shaft 4. If the solenoid 28 is energized, the driving lever 27 is swung in a direction denoted by an arrow of a solid line. If the solenoid is deenergized, the lever 27 is swung in the opposite direction as denoted by an arrow of a broken line.

If the used ticket 2 is inserted into the inlet port 1*a* of the machine body 1, the insertion is detected by a detector 3. In response to the detection, the solenoid 28 is energized so as to swing the driving lever 27 in the direction denoted by the arrow of solid line. As a result, the shutter 19 and the gate 17 are swung in the same direction so as to open the shutter 19 and bring the intake roller 18 into contact with the transporting roller 20. In this step, the encode motor 13 is operated so a to rotate the transporting roller 20 and, thus, to transport the used ticket. Also, the used ticket is detected by gate opening/closing sensor 37 mounted on the ticket transporting path 21. Based on the detection of the passage of the used ticket by the gate opening/closing sensor 37 (or an encode sensor 36), the gate 17 is swung by the solenoid 28 in the direction denoted by the arrow of broken line in FIG. 2. As a result, the shutter 19 permits closing the inlet port 1*a*. When the used ticket 2 reaches the magnetic reading head 5, the information recorded on the back surface of the used ticket is read by the magnetic read head 5. After the information has been read out, the used ticket 2 passes though a gate opening/closing sensor 37 and, then, is sent in the reverse direction so as to be recovered in the recovery box 14. To be more specific, the solenoid 28 is deenergized in this step, with the result that the gate 17 is swung in the clockwise direction as denoted by the arrow of broken line in FIG. 2. The swing causes the intake roller 18 to be moved downward at one end portion and upward at the other end portion. As a result, the used ticket 2, which is transported in the reverse direction, is guided by the gate 17 toward the recovery transporting path 31 so as to be temporarily stored in the temporary storing section 38. In this step, a cutter motor 11 is rotated so as to operate the cutter unit 8 to cut the rolled paper 9 into a blank ticket of a predetermined size. After the cutting a loading motor 10 is rotated so as to permit loading of the rolled paper 9, and printing is performed on the rolled paper 9 by the printing device 7, the blank ticket is transported by the rotation of the encode motor 13. After the blank ticket is detected by an encode sensor 36, the magnetic writing head 6 writes information on the back surface of the blank ticket. In the next step, the blank ticket is detected by the gate opening/closing sensor 37 so as to permit the solenoid 28 to swing the gate 17 in the direction denoted by the arrow of solid line in FIG. 2. As a result, the shutter 19 opens the inlet port 1*a*. Then, the ticket is issued to the outside through the inlet port 1*a* as a fare-adjusted ticket.

Also, detection of the blank ticket by the gate opening/closing sensor 37 causes the used ticket stored in the temporary storing section 38 to be recovered in the recovery box 14 through the gate 34 and the chute 16.

Where an error ticket is put into the ticket processing machine, when a failure occurs in the magnetic encoding into a ticket, the error ticket is similarly transported in the reverse direction and, then, guided by the gate 17 toward the recovery transporting path 31 so as to be recovered in the recovery box 15 through the gate 35 and the chute 24.

As described above, the shutter 19 and the intake roller 18 are mounted to the gate 17 so as to form an integral structure. Since the shutter 19 and the intake roller 18 are interlockingly operated in response to the rotation of the gate 17, the ticket processing machine of the present invention can be made simpler in construction than the prior art in which the gate 17, the shutter 19 and the intake roller 18 are operated independently. In addition, the integral structure employed in the present invention permits enhancing the reliability and lowering the manufacturing cost of the machine.

Where the recovery box 14, which has become full of the used tickets 2, is taken out, the machine body 1 is withdrawn in the direction denoted by an arrow as shown in FIG. 4. As a result, the recovery box 14 is exposed to the outside. Under this condition, the recovery box 14 is taken to the outside. Since the recovery box 14 is disposed outside of the machine body 1, the size of the recovery box is not restricted by the space of installation. Naturally, the recovery box 14 can be enlarged, as desired.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A conveying apparatus for conveying a recording medium having data recorded thereon, comprising:

an inlet port for receiving the recording medium;

reading means for reading the data from the recording medium;

first conveying means for conveying the recording medium from the inlet port to the reading means;

second conveying means for conveying the recording medium read by the reading means from the reading means to another position in the apparatus, the second conveying means branching from a predetermined position of the first conveying means; and guiding means, provided at the predetermined position of the first conveying means and selectively positionable at first and second positions, for guiding the recording medium from the inlet port to the first conveying means when the guiding means is at the first position and for both guiding the recording medium from the first conveying means to the second conveying means and preventing insertion of another recording medium, received by the inlet port, into the first conveying means when the guiding means is at the second position.

2. The conveying apparatus according to claim 1, further comprising collecting means, provided at the another position, for collecting the recording medium.

3. A conveying apparatus for conveying a recording medium having data recorded thereon, comprising:

an inlet port for receiving the recording medium;

reading means for reading the data from the recording medium;

first conveying means for conveying the recording medium from the inlet port to the reading means in a first direction;

sensing means for sensing a conclusion of reading of the data of the recording medium by the reading means;

second conveying means for conveying the recording medium from the reading means in a direction toward the inlet port in accordance with the sensing by the sensing means;

third conveying means for conveying the recording medium conveyed by the second conveying means to another position in the apparatus, the third conveying means branching at a predetermined position of the second conveying means; and guiding means, provided at the predetermined position and selectively positionable at first and second positions, for guiding the recording medium from the inlet port to the first conveying means when the guiding means is at the first position and for both guiding the recording medium from the second conveying means to the third conveying means and preventing inserting of another recording medium, received by the inlet port, into the first conveying means when the guiding means is at the second position.

4. The conveying apparatus according to claim 3, further comprising collecting means, provided at the another position, for collecting the recording medium.

5. A conveying apparatus for conveying a recording medium having data recorded thereon, comprising:

an inlet port for receiving the recording medium;

reading means for reading the data from the, recording medium;

first conveying means for conveying the recording medium from the inlet port to the reading means;

issuing means for issuing a second recording medium and supplying the second recording medium to the first conveying means;

means for writing second data to the second recording medium;

means for sensing conclusion of reading of the recording medium and conclusion of writing to the second recording medium;

second conveying means for conveying the recording medium and the second reading medium from the first conveying means in accordance with the sensing of the sensing means;

third conveying means for conveying the first recording medium conveyed by the second conveying means to another position in the apparatus, the third conveying means branching at a predetermined position of the second conveying means; and guiding means, provided at the predetermined position and selectively positionable at first and second positions, for guiding the first recording medium from the inlet port to the first conveying means when the guiding means is at the first position and for both guiding the first recording medium from the second conveying means to the third conveying means and preventing inserting of another recording medium, received by the inlet port, into the first conveying means when the guiding means is at the second position.

6. The conveying apparatus according to claim 5, wherein the guiding means includes means for transferring the second recording medium from the second conveying means to the inlet port.

7. The conveying apparatus according to claim 5, further comprising collecting means, provided at the another position, for collecting the first recording.

8. The conveying apparatus according to claim 1, wherein the guiding means is a single member.

9. The conveying apparatus according to claim 3, wherein the guiding means is a single member.

10. The conveying apparatus according to claim 5, wherein the guiding means is a single member.

* * * * *